(No Model.)
G. H. THYNNE.
JOINT FOR PIPES.
No. 393,673. Patented Nov. 27, 1888.
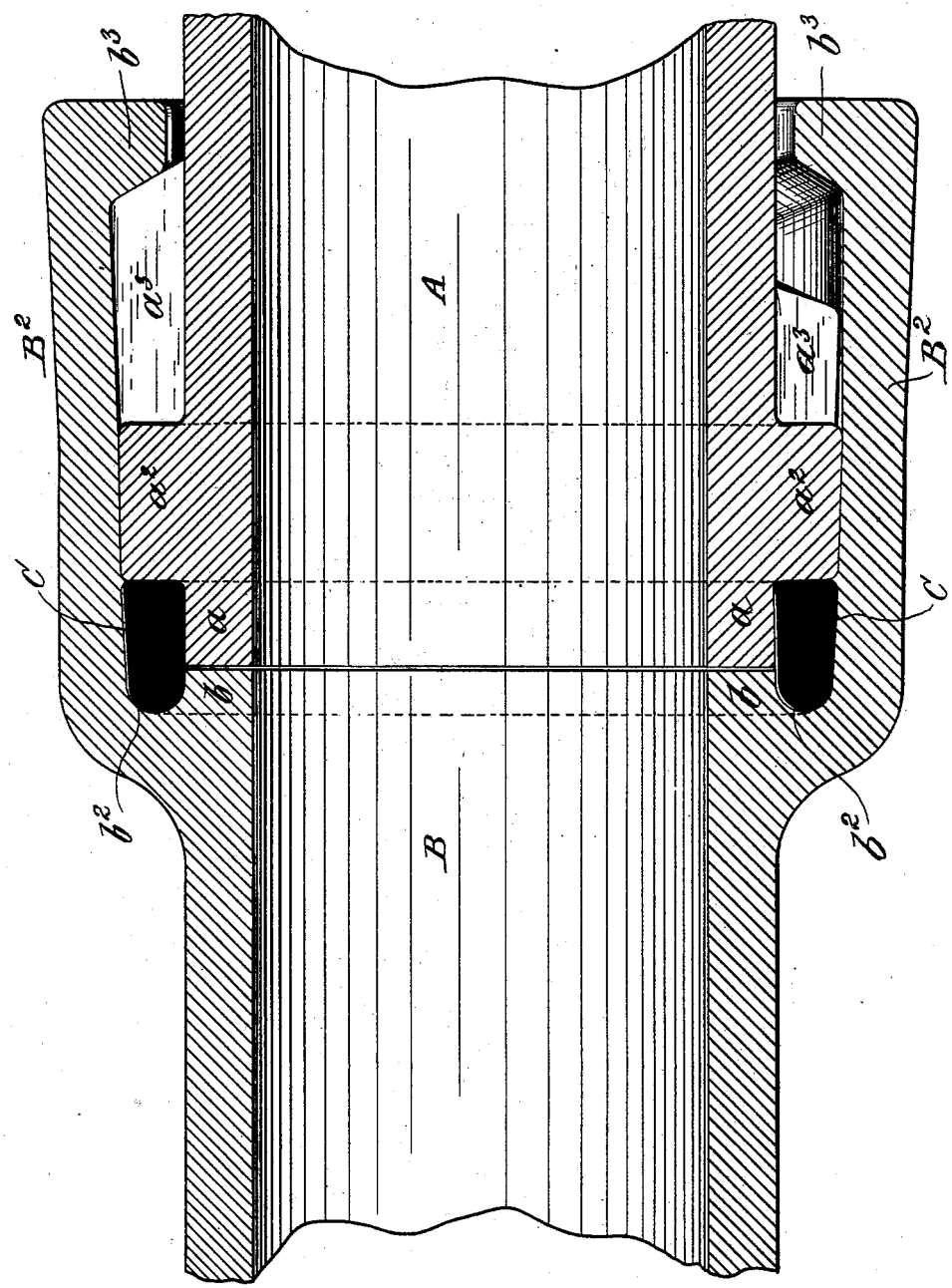
Witnesses:
Inventor:

UNITED STATES PATENT OFFICE.

GUY HARRY THYNNE, OF WESTMINSTER, ENGLAND.

JOINT FOR PIPES.

SPECIFICATION forming part of Letters Patent No. 393,673, dated November 27, 1888.

Application filed July 5, 1888. Serial No. 279,102. (No model.) Patented in England May 18, 1885, No. 6,077.

*To all whom it may concern:*

Be it known that I, GUY HARRY THYNNE, land agent, a subject of the Queen of Great Britain, residing at 11 Great George Street, in the city of Westminster, England, have invented a certain Improved Joint for Pipes, (for which I have obtained a patent in Great Britain, No. 6,077, dated May 18, 1885,) of which the following is a specification.

My invention has for its object to provide a joint for pipes of metal or earthenware or other suitable material for conveying water, gas, steam, or other fluid under pressure, wherein the greater the pressure in the pipes the more secure and fluid-tight will the joint become.

According to my invention I make the pipe ends to be joined butt against each other, and outside these butting ends I form an annular chamber, in which a ring of elastic or yielding material is contained, which overlaps the joint and extends over the exterior of each pipe end. The walls of this chamber are formed by the pipe ends and by a groove and socket on one pipe end and an annular projection encircling the other pipe end at a short distance from the end. The pipe ends are joined by any suitable device—such as, for instance, by means of inclined bayonet-grooves and projections on the pipe ends inclined in such a direction that by a movement of partial rotation of the pipe end in the socket, or of the socket on the pipe end, the pipe ends are forced together and the elastic material is compressed or held in place in the aforesaid chamber.

The accompanying drawing is a longitudinal section of two pipe ends furnished with a joint according to my invention.

The end of the pipe A butts at $a$ against the end at $b$ of the pipe B. On the outside of the end of the pipe B is formed the socket $B^2$, with a groove at $b^2$. On the outside of the end of the pipe A is formed an annular projection, $a^2$. The exteriors of the pipe ends $a$ $b$, the socket $B^2$, the groove $b^2$, and the projection $a^2$ form between them an annular chamber, in which is received the ring C, of elastic or yielding material—such, for example, as india-rubber. At intervals on the outer end of the socket $B^2$ are projections $b^3$, inclined inward, and with spaces between them, through which can be passed the correspondingly-inclined projections $a^3$ on the exterior of the end of the pipe A, and then by a partial rotation the projections $a^3$ pass behind the projections $b^3$, and the inclines thereof give an inward pressure, forcing one pipe end against the other and inclosing or compressing the elastic or yielding material C in the chamber formed for it by the pipe ends $a$ $b$, projection $a^2$, socket $B^2$, and groove $b^2$, the said elastic or yielding material C overlapping the exteriors of both the pipe ends $a$ $b$. It will be seen that the pressure of fluid in the pipes which finds its way between the ends $a$ $b$ forces the elastic material against the walls of the chamber constituted by the projection $a^2$, groove $b^2$, and socket $B^2$, and that the greater the pressure the tighter will this elastic or yielding material C be pressed against the said walls and the firmer and more fluid-tight will be the joint.

I claim as my invention—

A pipe-joint formed by the butting pipe ends $a$ $b$, the groove $b^2$, the socket $B^2$, the projection $a^2$, and the elastic or yielding substance C, which overlaps the exteriors of both pipe ends, so that any leakage of fluid-pressure past the ends of the pipes presses the material C firmly against the sides of its chamber formed by the flange $B^2$, groove $b^2$, and projection $a^2$, substantially as hereinbefore described, and illustrated in the accompanying drawing.

In testimony whereof I have signed my name to this specification in the presence of two subscribing witnesses.

GUY HARRY THYNNE.

Witnesses:
W. H. HARRIS,
*Notary Public, Birmingham, England.*
ALBERT NEWEY,
*Clerk to Reece, Harris & Harris, Solicitors, Birmingham.*